(12) United States Patent
Yoo et al.

(10) Patent No.: US 8,799,913 B2
(45) Date of Patent: Aug. 5, 2014

(54) COMPUTING SYSTEM, METHOD AND COMPUTER-READABLE MEDIUM FOR MANAGING A PROCESSING OF TASKS

(75) Inventors: Jeong Joon Yoo, Yongin-si (KR); Shi Hwa Lee, Seoul (KR); Seung Won Lee, Hwaseong-si (KR); Young Sam Shin, Hwaseong-si (KR); Min Yung Son, Yongin-si (KR)

(73) Assignee: Samsung Electronics Co., Ltd, Suwon (KR)

( * ) Notice: Subject to any disclaimer, the term of this patent is extended or adjusted under 35 U.S.C. 154(b) by 264 days.

(21) Appl. No.: 12/907,639

(22) Filed: Oct. 19, 2010

(65) Prior Publication Data
US 2011/0167427 A1 Jul. 7, 2011

(30) Foreign Application Priority Data
Jan. 7, 2010 (KR) .................. 10-2010-0001101

(51) Int. Cl.
*G06F 9/46* (2006.01)
*G06F 9/48* (2006.01)

(52) U.S. Cl.
CPC .................. *G06F 9/4881* (2013.01)
USPC .......................................... 718/103; 718/105

(58) Field of Classification Search
None
See application file for complete search history.

(56) References Cited

U.S. PATENT DOCUMENTS

| | | | | |
|---|---|---|---|---|
| 5,247,677 A | * | 9/1993 | Welland et al. | 718/103 |
| 5,623,672 A | * | 4/1997 | Popat | 710/240 |
| 5,692,193 A | * | 11/1997 | Jagannathan et al. | 718/106 |
| 5,745,778 A | * | 4/1998 | Alfieri | 712/1 |
| 6,105,053 A | * | 8/2000 | Kimmel et al. | 718/105 |
| 6,341,303 B1 | * | 1/2002 | Rhee et al. | 718/104 |
| 6,496,871 B1 | * | 12/2002 | Jagannathan et al. | 719/317 |
| 7,047,322 B1 | * | 5/2006 | Bauman et al. | 710/6 |
| 7,120,783 B2 | * | 10/2006 | Fotland et al. | 712/228 |
| 7,159,221 B1 | * | 1/2007 | Willen et al. | 718/104 |
| 7,321,965 B2 | * | 1/2008 | Kissell | 712/229 |
| 7,360,219 B2 | * | 4/2008 | Rhine | 718/104 |
| 7,376,954 B2 | * | 5/2008 | Kissell | 718/107 |
| 7,380,039 B2 | * | 5/2008 | Miloushev et al. | 710/244 |
| 7,526,767 B1 | * | 4/2009 | Rhee et al. | 718/104 |
| 7,548,335 B2 | | 6/2009 | Lawrence et al. | |
| 7,761,875 B2 | * | 7/2010 | Karamanolis et al. | 718/102 |
| 7,840,966 B2 | * | 11/2010 | Dodge et al. | 718/102 |
| 8,020,163 B2 | * | 9/2011 | Nollet et al. | 718/104 |
| 8,194,658 B2 | * | 6/2012 | Shin et al. | 370/389 |
| 8,205,205 B2 | * | 6/2012 | Franke | 718/103 |
| 8,219,997 B2 | * | 7/2012 | Shimizu et al. | 718/104 |
| 8,271,741 B2 | * | 9/2012 | Mutlu et al. | 711/151 |

(Continued)

FOREIGN PATENT DOCUMENTS

| | | |
|---|---|---|
| JP | 2002-197046 | 7/2002 |
| KR | 10-0636272 | 10/2006 |

OTHER PUBLICATIONS

Jeong-Joon Yoo et al., "Rawls Scheduler: Load Considered Proportional Share Scheduling for High Performance Multimedia Systems," PDCAT, 2010: 34-41.

*Primary Examiner* — Van Nguyen
(74) *Attorney, Agent, or Firm* — Staas & Halsey LLP (57) ABSTRACT

A computing system, method and computer-readable medium is provided. To prevent a starvation phenomenon from occurring in a priority-based task scheduling, a plurality of tasks may be divided into a priority-based group and other groups. The groups to which the tasks belong may be changed.

16 Claims, 9 Drawing Sheets

(56) References Cited

U.S. PATENT DOCUMENTS

| | | | |
|---|---|---|---|
| 8,561,072 B2* | 10/2013 | Ringseth et al. | 718/102 |
| 2003/0037091 A1* | 2/2003 | Nishimura et al. | 709/103 |
| 2004/0194097 A1* | 9/2004 | Spencer | 718/100 |
| 2005/0050552 A1 | 3/2005 | Fuller | |
| 2005/0125789 A1* | 6/2005 | Dijkstra et al. | 718/100 |
| 2008/0115143 A1* | 5/2008 | Shimizu et al. | 718/105 |
| 2009/0122766 A1* | 5/2009 | Hughes et al. | 370/336 |
| 2009/0217273 A1* | 8/2009 | Mutlu et al. | 718/101 |
| 2009/0300637 A1* | 12/2009 | Ringseth et al. | 718/104 |
| 2011/0161973 A1* | 6/2011 | Klots et al. | 718/104 |

* cited by examiner

COMPUTING SYSTEM, METHOD AND COMPUTER-READABLE MEDIUM FOR MANAGING A PROCESSING OF TASKS

CROSS-REFERENCE TO RELATED APPLICATIONS

This application claims the benefit of Korean Patent Application No. 10-2010-0001101, filed on Jan. 7, 2010, in the Korean Intellectual Property Office, the disclosure of which is incorporated herein by reference.

BACKGROUND

1. Field

Example embodiments of the following description relate to a computing system, a digital TV (DTV), an MPEG Audio Layer-3 (MP3) player, a printer, and a Solid State Disk (SSD), which enable a priority-based task scheduling. More particularly, example embodiments of the following description relate to a method that may prevent occurrence of a starvation phenomenon while maintaining priorities of tasks through task scheduling.

2. Description of the Related Art

In a computing system using a Central Processing Unit (CPU), a Direct Memory Access (DMA), and a network, and in a variety of electronic products, several processes or threads (hereinafter, referred to as "tasks") may be executed. In this instance, there is a demand to schedule tasks to determine an order of processing the tasks using limited resources.

Typically, priorities may be respectively set to tasks, and the tasks may be scheduled, so that a higher priority task may be processed first among the tasks having different priorities. This operation is called "priority-based scheduling".

For example, when a task associated with multimedia applications to be processed in real-time is set to have a relatively higher priority, the task may be scheduled to be processed earlier than other tasks.

However, priority-based scheduling has a problem of a starvation phenomenon where a lower priority task will never be executed because a higher priority task continues to occupy resources.

SUMMARY

Accordingly, it is an aspect of example embodiments to provide a computing system, method and computer-readable medium that may prevent a starvation phenomenon of lower priority tasks while maintaining a resource occupancy rate based on task priorities in a priority-based task scheduling.

Also, it is another aspect of example embodiments to provide an efficient computing system, method and computer-readable medium that may schedule tasks adaptively depending on whether sufficient resources are available, so that a higher priority task may be executed more frequently.

The foregoing and/or other aspects are achieved by providing a computing system, including a task management unit to divide a plurality of tasks to be processed into a first group and a second group, the first group based on a priority and including a virtual task representing tasks in the second group, and a processing unit to process tasks in the first group according to the priority, wherein, when the virtual task is to be processed, the processing unit selects one of the tasks in the second group and processes the selected task.

When the virtual task is to be processed, the processing unit may process one task that is selected from the tasks in the second group using a Round-Robin scheme.

Also, when the virtual task is to be processed, the processing unit may process one task that is randomly selected from the tasks in the second group.

The computing system may further include a load rate measuring unit to measure a rate of a time taken to process the virtual task with respect to a time taken to process the tasks in the first group.

When the measured rate is equal to or greater than a first threshold, the task management unit may move a highest priority task among the tasks in the second group to the first group.

When the measured rate is equal to or less than a second threshold, the task management unit may move a lowest priority task among the tasks in the first group to the second group.

When a new task to be processed is generated in the computing system, and when a priority of the new task is higher than a priority of a lowest priority task among the tasks in the first group, the task management unit may move the new task to the first group. When the priority of the new task is lower than the priority of the lowest priority task, the task management unit may move the new task to the second group.

The task management unit may manage a first pointer to point to a lowest priority task among the tasks in the first group. When the measured rate is equal to or greater than the first threshold, the task management unit may move the highest priority task among the tasks in the second group to the first group, and may adjust the first pointer to point to the moved task.

The task management unit may manage a second pointer to point to a highest priority task among the tasks in the second group. When the measured rate is equal to or less than the second threshold, the task management unit may move the lowest priority task among the tasks in the first group to the second group, and may adjust the second pointer to point to the moved task.

The task management unit may manage a first pointer to point to a lowest priority task among the tasks in the first group, and a second pointer to point to a highest priority task among the tasks in the second group. When a new task to be processed is generated, and when a priority of the new task is higher than a priority of the lowest priority task pointed to by the first pointer, the task management unit may move the new task to the first group. When the priority of the new task is equal to or lower than the priority of the lowest priority task pointed to by the first pointer, the task management unit may move the new task to the second group. When the priority of the new task moved to the second group is compared with a priority of the highest priority task pointed to by the second pointer, the task management unit may adjust the second pointer to point to a highest priority task among the tasks and the new task that are in the second group.

The foregoing and/or other aspects are achieved by providing a computing method, including dividing, by a processor, a plurality of tasks to be processed into a first group and a second group, the first group based on a priority and including a virtual task representing tasks in the second group, and processing, by the processor, tasks in the first group according to the priority, wherein the processing includes selecting one of the tasks in the second group and processing the selected task when the virtual task is to be processed.

According to another aspect of one or more embodiments, there is provided at least one computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects, features, and advantages of embodiments will become apparent and more readily appreciated from the following description, taken in conjunction with the accompanying drawings of which.

DETAILED DESCRIPTION

Reference will now be made in detail to embodiments, examples of which are illustrated in the accompanying drawings, wherein like reference numerals refer to like elements throughout. Embodiments are described below to explain the present disclosure by referring to the figures.

Figure 1:
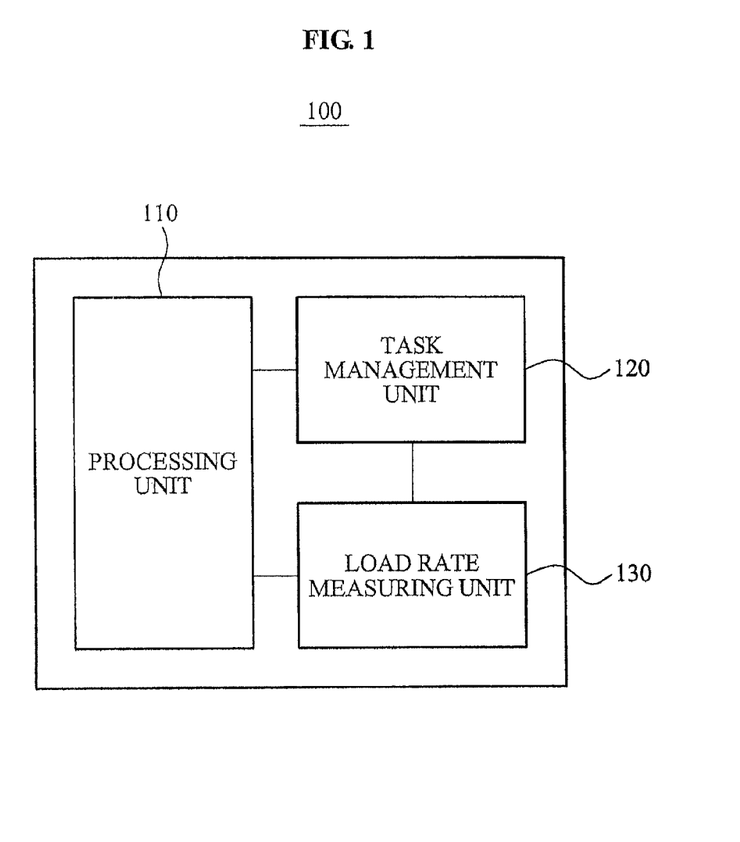
FIG. 1 illustrates a block diagram of a computing system according to example embodiments.

FIG. 1 illustrates a block diagram of a computing system 100 according to example embodiments.

The computing system 100 of FIG. 1 may include a processing unit 110, a task management unit 120, and a load rate measuring unit 130. The processing unit 110 may process a plurality of tasks. The task management unit 120 may perform scheduling so that the plurality of tasks may be processed by the processing unit 110. Also, the load rate measuring unit 130 may improve scheduling efficiency.

The task management unit 120 may divide the plurality of tasks to be processed by the processing unit 110 into a first group and a second group.

A priority-based scheduling may be performed in the first group, and may not be performed in the second group. In this instance, the first group may include a virtual task that represents tasks in the second group. The virtual task may have a lowest priority in the first group.

Also, the task management unit 120 may perform a task scheduling so that tasks in the first group may be processed sequentially according to their priorities, and that one of the tasks in the second group may be processed when the virtual task of the first group is to be processed.

Accordingly, it is possible to process the plurality of tasks according to the priorities, and to prevent a starvation phenomenon. Hereinafter, this operation will be further described with reference to FIG. 2.

The load rate measuring unit 130 may periodically or continuously measure a load rate. In other words, a rate of a time taken to process the virtual task with respect to a time taken to process the plurality of tasks may be measured, based on the scheduling performed by the task management unit 120.

The measured load rate may be used to perform a task promotion or a task demotion. The task promotion will be further described with reference to FIGS. 2 and 3, and the task demotion will be further described with reference to FIGS. 4 and 5.

Figure 2:
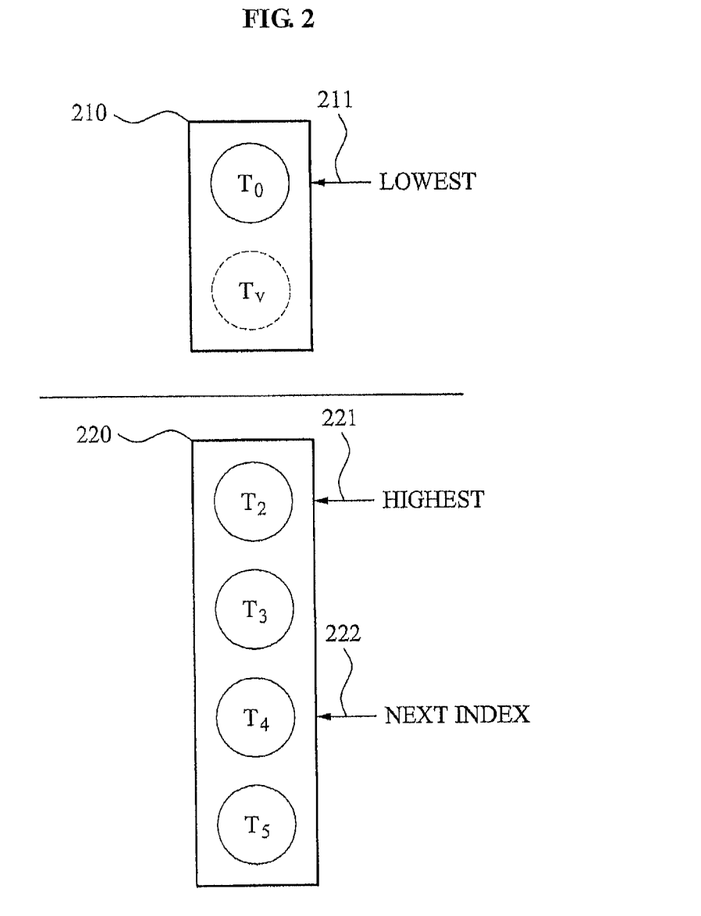
FIG. 2 conceptually illustrates a plurality of tasks grouped by a computing method according to example embodiments.

FIG. 2 conceptually illustrates a plurality of tasks grouped by a computing method according to example embodiments.

The plurality of tasks to be processed in the computing system 100 may have their respective priority levels.

Referring to FIG. 2, five tasks $T_0$, $T_2$, $T_3$, $T_4$, and $T_5$ are to be processed. The task $T_0$ has a highest priority level, and the tasks $T_2$ to $T_5$ are arranged in a descending priority order.

A priority level may be typically determined depending on how many requests to process a task in real-time are received.

However, in this instance, when resources are allocated to the tasks $T_0$ to $T_5$ in the descending priority order, a lowest priority task, for example the task $T_5$, may be subjected to the starvation phenomenon where no resources are allocated.

Specifically, when a new task with a higher priority than the task $T_5$ is input, resources may be allocated to the new task earlier than the task $T_5$ according to the descending priority order, and accordingly, no resources may be allocated to task $T_5$.

To prevent the starvation phenomenon from occurring due to the task scheduling based on only the priority, various conventional methods for equally allocating resources to tasks in task scheduling have been proposed.

For example, there is proposed a method of processing a highest priority task for a predetermined time slice and of processing other tasks for other time slices using a Round-Robin scheme.

However, in this instance, priorities of tasks other than the highest priority task may be disregarded, and thus, all of the tasks may be processed regardless of the priorities.

This conventional method fails to match the original intent of assigning priorities to tasks, even though the starvation phenomenon is prevented. In other words, it is not desirable to use the conventional method in the task scheduling.

According to example embodiments, all of the tasks may be divided into at least two groups.

During initial setting, the highest priority task $T_0$ is classified in a first group 210, and the other tasks $T_2$ to $T_5$ are classified in a second group 220, as shown in FIG. 2.

The first group 210 includes a virtual task $T_v$ representing all of the tasks $T_2$ to $T_5$ in the second group 220.

Here, the priority-based task scheduling may be performed in the first group 210, so that the tasks $T_0$ and $T_v$ may be processed according to their priorities.

A task selected from the first group 210 may enter a sleep state for a predetermined period of time. When the predetermined period of time elapses, a current state of the selected task may be changed to a ready state and the selected task may be moved to a ready queue where the tasks in the first group 210 are ready to be processed. Accordingly, the selected task may be set as a candidate of the priority-based task scheduling. When another task enters the sleep state, another higher priority task may be selected from the ready queue of the first group 210, and the selected task may be processed.

When a highest priority task continues to be processed, rather than entering the sleep state, a task demotion may occur due to a low load rate of the virtual task $T_v$, and the highest priority task may be moved from the first group 210 to the second group 220. Accordingly, the first group 210 may include only the virtual task $T_v$, and the second group 220 may include the tasks except for the virtual task $T_v$. The plurality of tasks may be scheduled using the Round-Robin scheme or a random scheduling scheme, for example.

When the load rate of the virtual task $T_v$ increase after a predetermined period of time elapses, a task promotion may occur with respect to a highest priority task in the second group 220, which will be described below.

When the virtual task $T_v$ is to be processed after the tasks in the first group 210 are sequentially processed, the task $T_4$ pointed to by a next index pointer 222 may be processed.

In other words, the next index pointer 222 may point to a task among the tasks in the second group 220, so that the task may be processed when the virtual task $T_v$ is to be processed.

The next index pointer 222 may be adjusted in the second group 220 using the Round-Robin scheme.

When the task $T_4$ pointed to by the next index pointer 222 is completely processed, the next index pointer 222 may be adjusted to point to the next task $T_5$. Thus, when the virtual task $T_v$ is to be processed, the task $T_5$ pointed to by the next index pointer 222 may be processed.

While the Round-Robin scheme is merely an example in the example embodiments, the example embodiments may be applied to schemes other than the Round-Robin scheme.

For example, when the virtual task $T_v$ is to be processed after the tasks in the first group 210 are sequentially processed according to their priorities, a task may be randomly selected from among the tasks in the second group 220, and the selected task may be processed.

As described above, the tasks in the first group 210 may be moved to the second group 220, which is referred to as "task demotion". Alternatively, the tasks in the second group 220 may be moved to the first group 210, which is referred to as "task promotion".

When the task demotion is performed in the first group 210 at a predetermined time, a lowest pointer 211 may point to a task to be moved to the second group 220. The lowest pointer 211 may point to a lowest priority task among the tasks in the first group 210 except for the virtual task $T_v$.

When the task promotion is performed in the second group 220 at a predetermined time, a highest pointer 221 may point to a task to be moved to the first group 210. The highest pointer 221 may point to a highest priority task among the tasks in the second group 220.

A time taken to process the virtual task $T_v$ while processing the tasks in the first group 210 may be measured. In other words, a rate of a time taken to process a task selected from the second group 220 with respect to a time taken to process all the tasks in the first group 210 may be measured. The measured rate is referred to as the "load rate". The load rate may be set to be a value between 0 and 1.

A high load rate means that tasks are scheduled almost regardless of the priority. In this instance, the priority is to be more involved in scheduling of all the tasks.

When the measured load rate is equal to or greater than a first threshold, the task promotion may be performed to move a task pointed to by the highest pointer 221 in the second group 220 to the first group 210.

Figure 3:
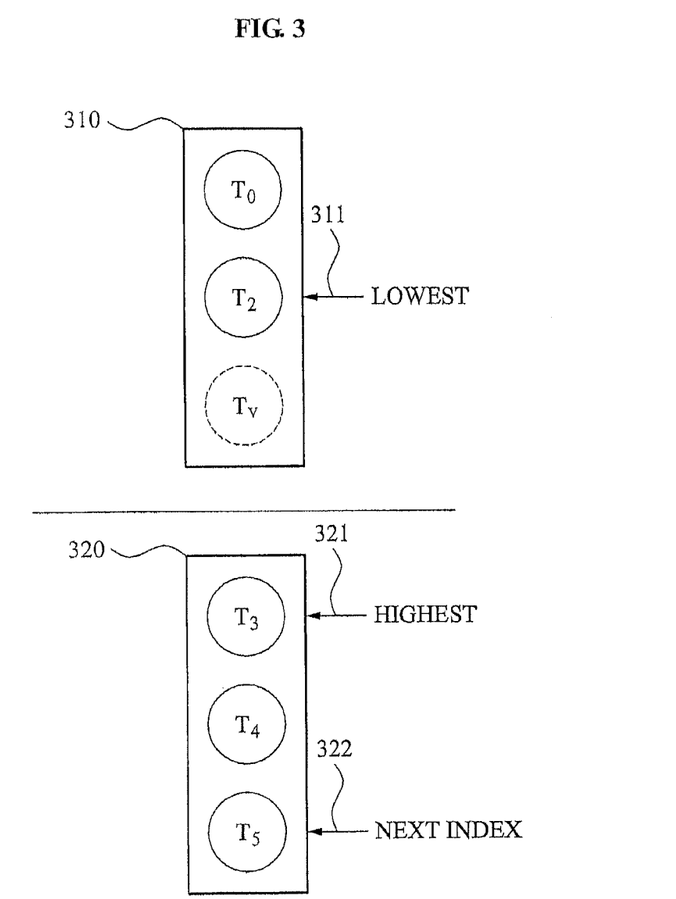
FIG. 3 conceptually illustrates a result of a task promotion performed by a computing method according to example embodiments.

Accordingly, the task $T_2$ pointed to by the highest pointer 221 may be moved to the first group 210, and such a result of the task promotion will be shown in FIG. 3.

FIG. 3 conceptually illustrates a result of a task promotion performed by a computing method according to example embodiments.

Referring to FIG. 3, the task $T_2$ is in a first group 310 as a result of the task promotion. The task $T_2$ may have the lowest priority in the first group 310, and thus, a lowest pointer 311 may be adjusted to point to the task $T_2$.

Also, a highest pointer 321 may be adjusted to point to a highest priority task, for example, task $T_3$ among the tasks $T_3$, $T_4$, and $T_5$ remaining in a second group 320.

The tasks $T_0$, $T_2$, and $T_v$ in the first group 310 may be processed sequentially according to their priorities. As described above, when the virtual task $T_v$ is to be processed after the tasks in the first group 310 are sequentially processed according to their priorities, the task $T_5$ pointed to by a next index pointer 322 may be processed.

The first threshold set in the initial setting may remain unchanged, and may be adaptively controlled based on an amount of remaining computing resources.

When the task promotion is repeated in such a manner as described above, a number of tasks in the first group 310 may be greater than a number of tasks in the second group 320.

Accordingly, a large number of tasks among all the tasks may be scheduled and processed, however, task efficiency may be rather reduced or other unexpected problems may occur.

In this instance, the task demotion needs to be performed with respect to a part of the tasks in the first group 310.

The task demotion will be described with reference to FIGS. 4 and 5.

Figure 4:
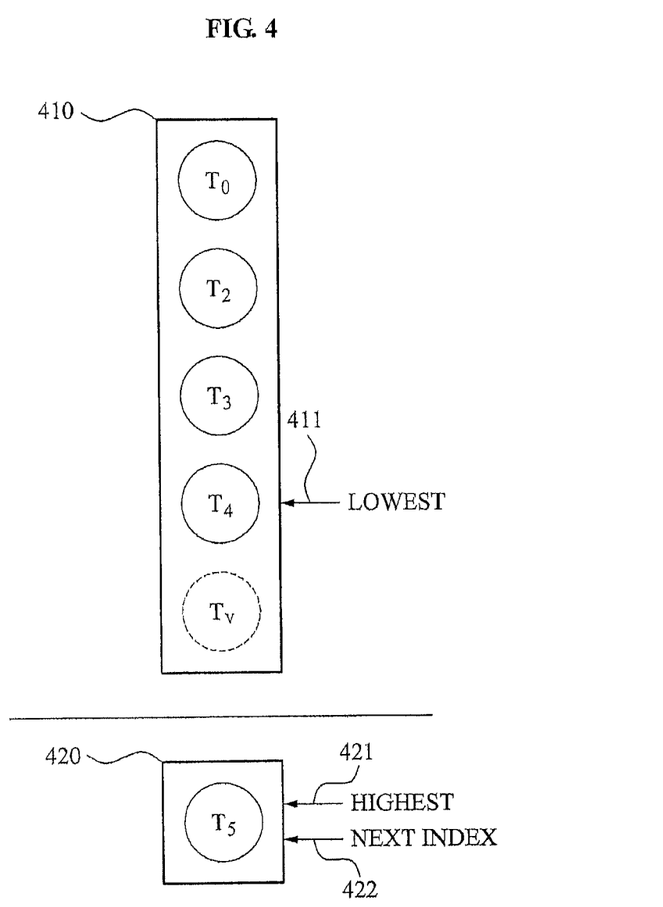
FIG. 4 conceptually illustrates an example where a task demotion is demanded, according to example embodiments.

FIG. 4 conceptually illustrates an example where the task demotion is demanded.

In FIG. 4, a first group 410 may include a large number of tasks as a result of the task promotion performed as described above. In this instance, a low load rate may be measured. The load rate refers to a rate of a time taken to process the virtual task $T_v$ with respect to a time taken to process all the tasks in the first group 410.

The load rate may be periodically or continuously measured. When the load rate is equal to or less than a second threshold, the task demotion may be performed.

During the task demotion, task $T_4$ pointed to by a lowest pointer 411 among the tasks in the first group 410 may be moved to a second group 420.

After the task $T_4$ is moved to the second group 420, the lowest pointer 411 may be adjusted to point to a lowest priority task, for example, task $T_3$.

The task $T_4$ may have the highest priority in the second group 420, and thus, a highest pointer 421 may be adjusted to point to the task $T_4$.

Also, a next index pointer 422 may be adjusted to point to the task $T_4$ moved by the task demotion to the second group 420. While the next index pointer 422 is adjusted in this example embodiment, other example embodiments may be applied to an example where the next index pointer 422 is not adjusted.

Figure 5:
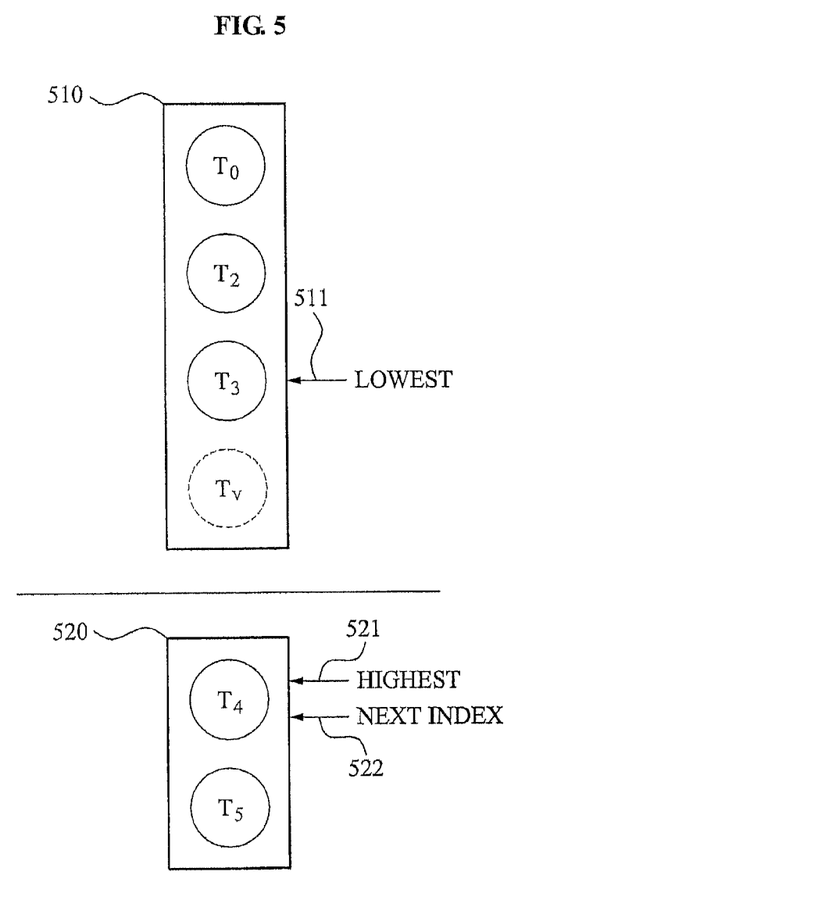
FIG. 5 conceptually illustrates a result of a task demotion performed by a computing method according to example embodiments.

FIG. 5 conceptually illustrates a result of a task demotion performed by a computing method according to example embodiments.

In FIG. 5, the task $T_4$ is moved to a second group 520, as a result of the task demotion performed as described above. Also, a highest pointer 521 and a next index pointer 522 may be adjusted to point to the task $T_4$.

A lowest pointer 511 may be adjusted to point to the task $T_3$ in a first group 510.

Accordingly, tasks in the first group 510 may be processed in a descending priority order. When the virtual task $T_v$ is to be processed, the task $T_4$ may be processed, and the next index pointer 522 may then be adjusted to point to the task $T_5$.

In this instance, when a new task is input, the new task may be input into one of the first group and the second group after a determination. Hereinafter, descriptions regarding the new task will be given with reference to FIGS. 6 and 7.

Figure 6:
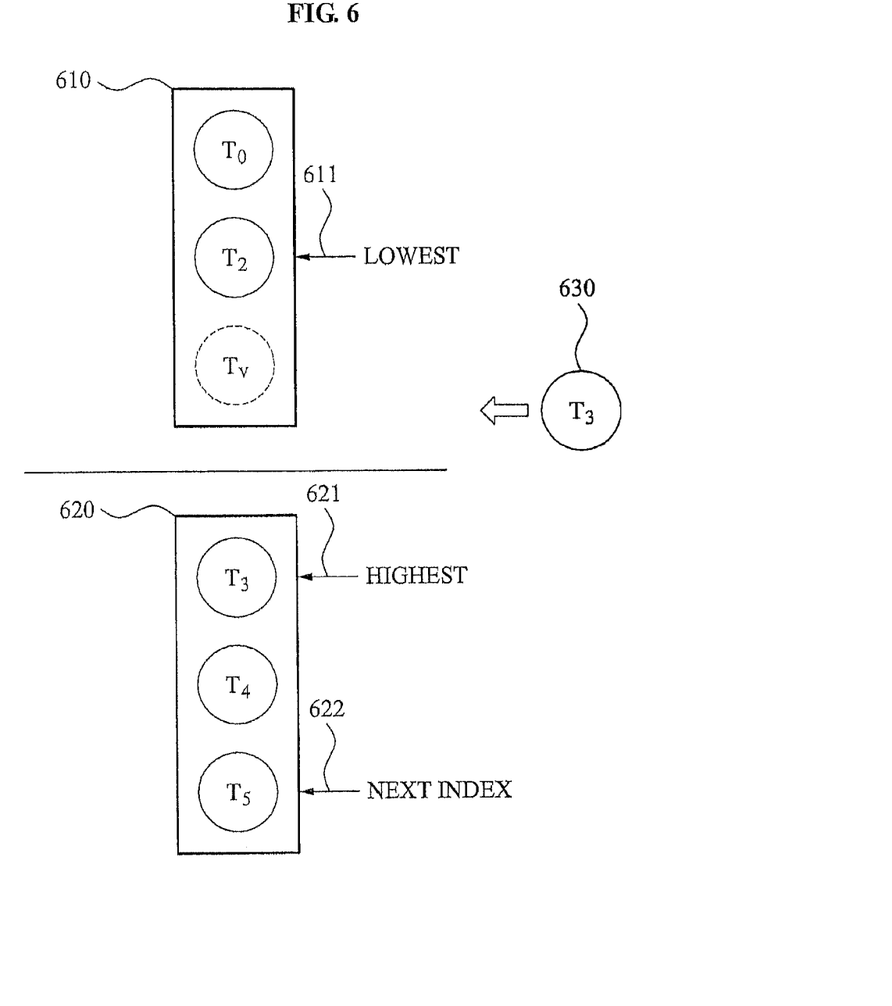
FIG. 6 conceptually illustrates an example where a new task is input to a computing system according to example embodiments.

FIG. 6 conceptually illustrates an example where a new task 630 is input to a computing system according to example embodiments.

In FIG. 6, a first group 610 contains tasks $T_0$, $T_2$, and $T_v$, and a lowest pointer 611 currently points to task $T_2$.

A second group 620 contains tasks $T_3$, $T_4$, and $T_5$, and a highest pointer 621 and a next index pointer 622 currently point to the task $T_3$ and the task $T_5$, respectively.

In this instance, the new task 630 is assumed to have a priority level of 3, which is equal to a priority level of the task $T_3$ in the second group 620.

The priority level of the new task 630 may be compared with a priority level of the task $T_2$ pointed to by the lowest pointer 611 in the first group 610.

As a result of the comparing, when the priority level of the new task 630 is less than or equal to than the priority of task $T_2$ pointed to by the lowest pointer 611, the new task 630 may be inserted in the second group 620.

In this instance, the highest pointer 621 may be adjusted to point to a highest priority task among the tasks $T_3$, $T_4$, and $T_5$ and the new task 630 that are in the second group 620.

Figure 7:
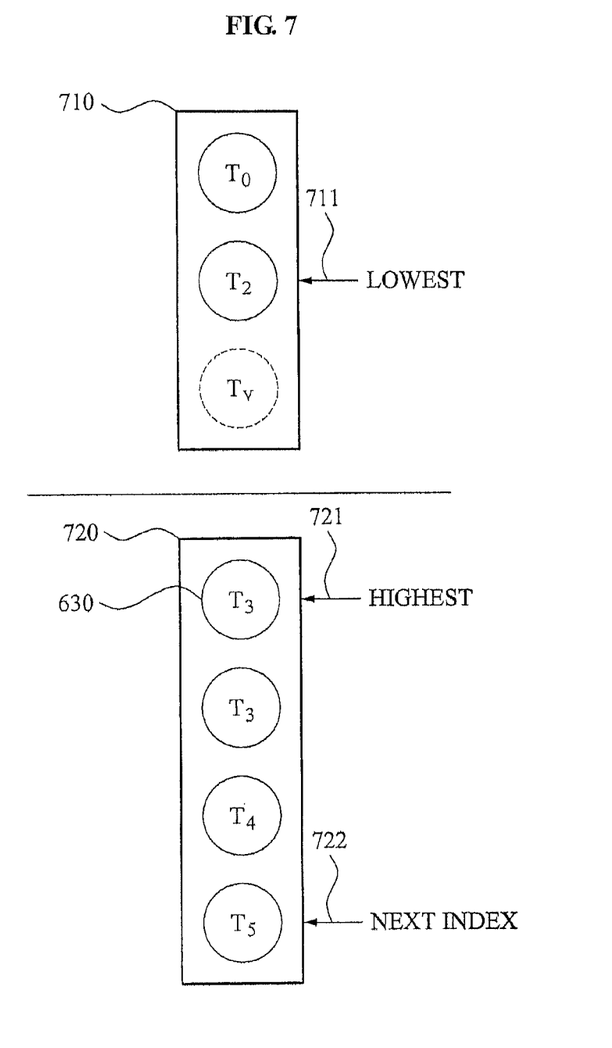
FIG. 7 conceptually illustrates a result of grouping the tasks including the input new task shown in FIG. 6 by a computing method according to example embodiments.

A result of the above-described operation is shown in FIG. 7.

FIG. 7 conceptually illustrates a result of grouping the tasks including the input new task 630.

Referring to FIG. 7, a first group 710 contains tasks $T_0$, $T_2$, and $T_v$, and a lowest pointer 711 currently points to the task $T_2$ in the same manner as the lowest pointer 611 of FIG. 6.

A second group 720 further includes the new task 630, and a highest pointer 721 currently points to the new task 630. In other words, two different tasks with the same priority level are in the second group 720.

After the plurality of tasks is grouped, the tasks in the first group 710 may be processed according to their priorities. When the virtual task $T_v$ is to be processed, task $T_5$ pointed to by a next index pointer 722 may be processed.

Figure 8:
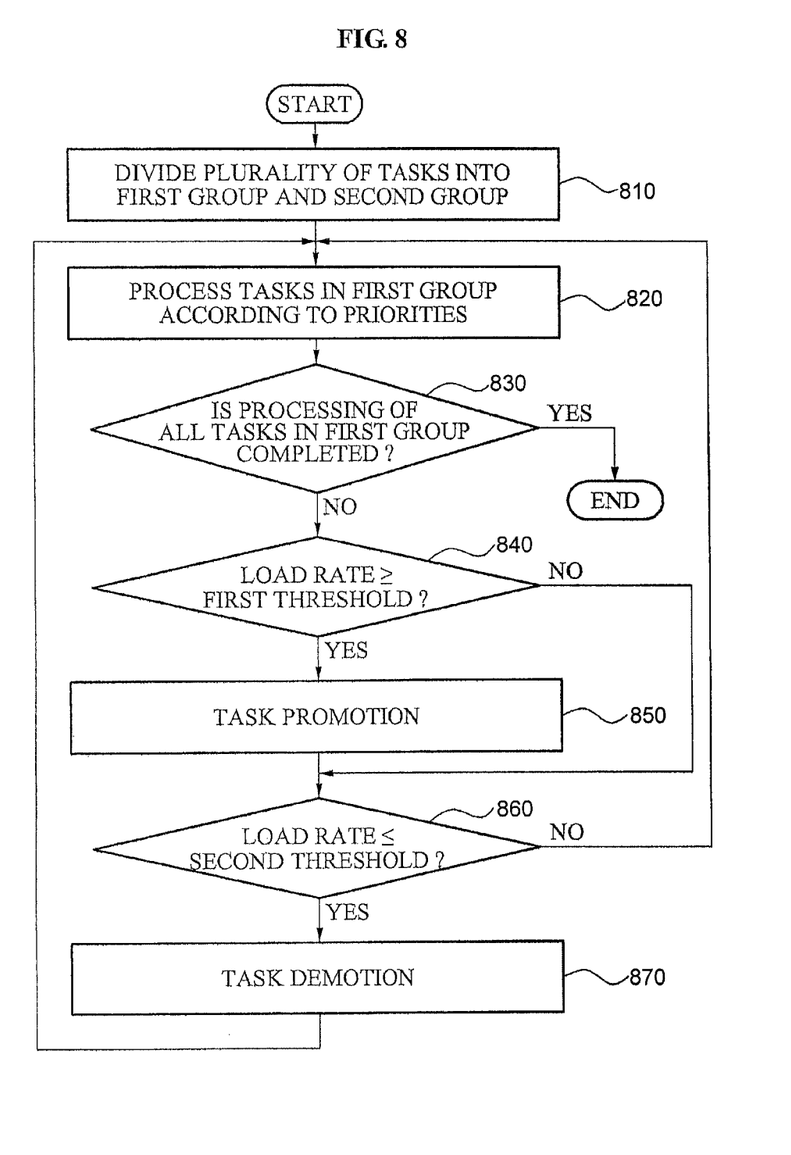
FIG. 8 illustrates a flowchart of a computing method according to example embodiments.

FIG. 8 illustrates a flowchart of a computing method according to example embodiments.

In operation 810, a plurality of tasks to be processed may be divided into a first group and a second group.

In operation 820, tasks in the first group may be processed according to their priorities. In operation 830, it may be determined whether processing of all the tasks in the first group is completed.

A load rate may be periodically or continuously measured. As described above, the load rate refers to a rate of a time taken to process the virtual task with respect to a time taken to process all the tasks in the first group. When determining that the processing of all the tasks in the first group is not completed in operation 830, a current load rate may be compared with a first threshold in operation 840.

When the current load rate is equal to or greater than the first threshold, a task promotion may be performed in operation 850. The task promotion has been described above with reference to FIGS. 2 and 3.

In operation 860, the current load rate may be compared with a second threshold.

When the current load rate is less than or equal to the second threshold, a task demotion may be performed in operation 870. The task demotion has been described above with reference to FIGS. 4 and 5.

The operations 840 to 870 may be repeated until the processing of all the tasks in the first group is determined to be completed.

Figure 9:
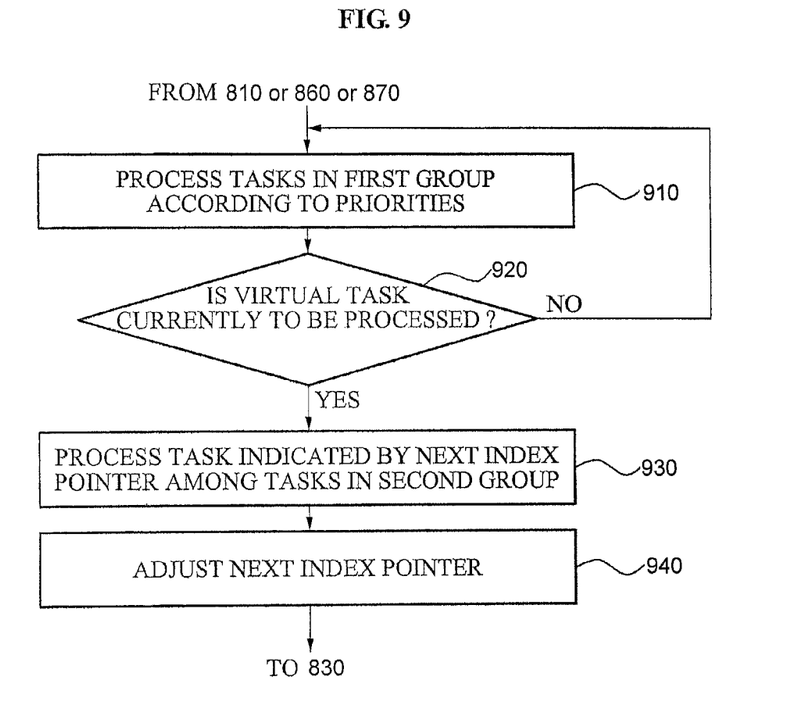
FIG. 9 illustrates a flowchart of an operation of processing tasks contained in a first group in the computing method of FIG. 8.

FIG. 9 further illustrates a flowchart of processing tasks in the first group according to their priorities of FIG. 8.

In operation 910, the tasks in the first group may be processed according to their priorities.

In operation 920, it may be determined whether the virtual task is currently to be processed. When the virtual task is determined to be processed, a task pointed to by a next index pointer among the tasks in the second group may be processed in operation 930.

In operation 940, the next index pointer may be adjusted to point to another task in the second group. In this instance, the next index pointer may be adjusted using a fairness scheduling scheme such as Round-Robin scheme, or in a random manner or the like.

The above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, the present disclosure is not limited to the described embodiments. Instead, it should be appreciated by those skilled in the art that changes may be made to these embodiments without departing from the principles and spirit of the disclosure, the scope of which is defined by the claims and their equivalents.

What is claimed is:

1. A computing system, comprising:
   a task management unit to divide a plurality of tasks to be processed into a first group and a second group, and to manage the tasks, the first group based on a priority and comprising a virtual task representing at least one of the tasks in the second group;
   a load rate measuring unit to measure a rate of a time taken to process the virtual task with respect to a time taken to process the tasks in the first group, and
   a processing unit to process tasks in the first group according to the priority, wherein, when the virtual task is to be processed, the processing unit selects one of the tasks in the second group and processes the selected task, wherein, when the measured rate is equal to or greater than a first threshold, the task management unit moves a highest priority task among the tasks in the second group to the first group, wherein the task management unit manages a first pointer to point to a lowest priority task among the tasks in the first group, and when the measured rate is equal to or greater than the first threshold, the task management unit moves the highest priority task among the tasks in the second group to the first group, and adjusts the first pointer to point to the moved task.

2. The computing system of claim 1, wherein, tasks in the first group have higher priorities than tasks in the second group.

3. The computing system of claim 1, wherein, when the virtual task is to be processed, the processing unit processes one task from the tasks in the second group.

4. The computing system of claim 1, wherein, when the virtual task is to be processed, the processing unit processes one task that is selected from the tasks in the second group using a Round-Robin scheme.

5. The computing system of claim 1, wherein, when the virtual task is to be processed, the processing unit processes one task that is randomly selected from the tasks in the second group.

6. The computing system of claim 1, wherein, when the measured rate is equal to or less than a second threshold, the task management unit moves a lowest priority task among the tasks in the first group to the second group.

7. The computing system of claim 6, wherein the task management unit manages a second pointer to point to a highest priority task among the tasks in the second group, and when the measured rate is equal to or less than the second threshold, the task management unit moves the lowest priority task among the tasks in the first group to the second group, and adjusts the second pointer to point to the moved task.

8. The computing system of claim 1, wherein, when a new task to be processed is generated, and when a priority of the new task is higher than a priority of a lowest priority task among the tasks in the first group, the task management unit moves the new task to the first group, and when the priority of the new task is equal to or lower than the priority of the lowest priority task, the task management unit moves the new task to the second group.

9. A computing system comprising, a task management unit to divide a plurality of tasks to be processed into a first group and a second group, and to manage the tasks, the first group based on a priority and comprising a virtual task representing tasks in the second group;

a processing unit to process tasks in the first group according to the priority, and a load rate measuring unit to measure a rate of a time taken to process the virtual task with respect to a time taken to process the tasks in the first group, wherein, when the virtual task is to be processed, the processing unit selects one of the tasks in the second group and processes the selected task, wherein, when a new task to be processed is generated, and when a priority of the new task is higher than a priority of a lowest priority task among the tasks in the first group, the task management unit moves the new task to the first group, and when the priority of the new task is equal to or lower than the priority of the lowest priority task, the task management unit moves the new task to the second group, wherein the task management unit manages a first pointer to point to a lowest priority task among the tasks in the first group, and a second pointer to point to a highest priority task among the tasks in the second group, when a new task to be processed is generated, and when a priority of the new task is higher than a priority of the lowest priority task pointed to by the first pointer, the task management unit moves the new task to the first group, when the priority of the new task is equal to or lower than the priority of the lowest priority task pointed to by the first pointer, the task management unit moves the new task to the second group, and when the priority of the new task moved to the second group is compared with a priority of the highest priority task pointed to by the second pointer, the task management unit adjusts the second pointer to point to a highest priority task among the tasks and the new task that are in the second group.

10. A computing method, comprising:

dividing, by a processor, a plurality of tasks to be processed into a first group and a second group, the first group based on a priority and comprising a virtual task representing at least one of the tasks in the second group;

measuring, by a load rate measuring unit, a rate of a time taken to process the virtual task with respect to a time taken to process the tasks in the first group; and processing, by the processor, tasks in the first group according to the priority, wherein, when the virtual task is to be processed, the processor selects one of the tasks in the second group and processes the selected task, wherein, when the measured rate is equal to or greater than a first threshold, the processor moves a highest priority task among the tasks in the second group to the first group, wherein the processor manages a first pointer to point to a lowest priority task among the tasks in the first group, and when the measured rate is equal to or greater than the first threshold, the processor moves the highest priority task among the tasks in the second group to the first group, and adjusts the first pointer to point to the moved task.

11. The computing method of claim 10, wherein the processing comprises processing one task that is selected from the tasks in the second group using a Round-Robin scheme, when the virtual task is to be processed.

12. The computing method of claim 10, wherein the processing comprises processing one task that is randomly selected from the tasks in the second group, when the virtual task is to be processed.

13. The computing method of claim 10, further comprising:

moving a lowest priority task among the tasks in the first group to the second group, when the measured rate is equal to or less than a second threshold.

14. At least one non-transitory computer-readable recording medium comprising computer readable instructions that control at least one processor to implement a method, comprising:

dividing a plurality of tasks to be processed into a first group and a second group, the first group based on a priority and comprising a virtual task representing at least one of the tasks in the second group;

measuring a rate of a time taken to process the virtual task with respect to a time taken to process the tasks in the first group; and processing tasks in the first group according to the priority, wherein, when the virtual task is to be processed, selecting one of the tasks in the second group and processes the selected task, wherein, when the measured rate is equal to or greater than a first threshold, moving a highest priority task among the tasks in the second group to the first group, wherein the processor manages a first pointer to point to a lowest priority task among the tasks in the first group, and when the measured rate is equal to or greater than the first threshold, moving the highest priority task among the tasks in the second group to the first group, and adjusts the first pointer to point to the moved task.

15. A computing method, comprising:

dividing, by a processor, a plurality of tasks to be processed into a first group and a second group, the first group comprising a virtual task representing at least one of the tasks in the second group;

processing tasks in the first group according to the priority, and measuring a rate of a time taken to process the virtual task with respect to a time taken to process the tasks in the first group, wherein, when the virtual task is to be processed, selecting one of the tasks in the second group and processes the selected task, wherein, when a new task to be processed is generated, and when a priority of the new task is higher than a priority of a lowest priority task among the tasks in the first group, moving the new task to the first group, and when the priority of the new task is equal to or lower than the priority of the lowest priority task, moving the new task to the second group, wherein the processor manages a first pointer to point to a lowest priority task among the tasks in the first group, and a second pointer to point to a highest priority task among the tasks in the second group, when a new task to be processed is generated, and when a priority of the new task is higher than a priority of the lowest priority task pointed to by the first pointer, moving the new task to the first group, when the priority of the new task is equal to or lower than the priority of the lowest priority task pointed to by the first pointer, moving the new task to the second group, and when the priority of the new task moved to the second group is compared with a priority of the highest priority task pointed to by the second pointer, adjusting the second pointer to point to a highest priority task among the tasks and the new task that are in the second group.

16. At least one non-transitory computer-readable recording medium comprising computer readable instructions that control at least one processor to implement a method, comprising:

dividing a plurality of tasks to be processed into a first group and a second group, the first group comprising a virtual task representing at least one of the tasks in the second group;

processing tasks in the first group according to the priority, and measuring a rate of a time taken to process the virtual task with respect to a time taken to process the tasks in the first group, wherein, when the virtual task is to be processed, selecting one of the tasks in the second group and processes the selected task, wherein, when a new task to be processed is generated, and when a priority of the new task is higher than a priority of a lowest priority task among the tasks in the first group, moving the new task to the first group, and when the priority of the new task is equal to or lower than the priority of the lowest priority task, moving the new task to the second group, wherein the processor manages a first pointer to point to a lowest priority task among the tasks in the first group, and a second pointer to point to a highest priority task among the tasks in the second group, when a new task to be processed is generated, and when a priority of the new task is higher than a priority of the lowest priority task pointed to by the first pointer, moving the new task to the first group, when the priority of the new task is equal to or lower than the priority of the lowest priority task pointed to by the first pointer, moving the new task to the second group, and when the priority of the new task moved to the second group is compared with a priority of the highest priority task pointed to by the second pointer, adjusting the second pointer to point to a highest priority task among the tasks and the new task that are in the second group.

* * * * *